March 27, 1934.   L. F. BIRD   1,952,306
QUARTZ MERCURY ARC LAMP
Filed Feb. 24, 1932   2 Sheets-Sheet 1
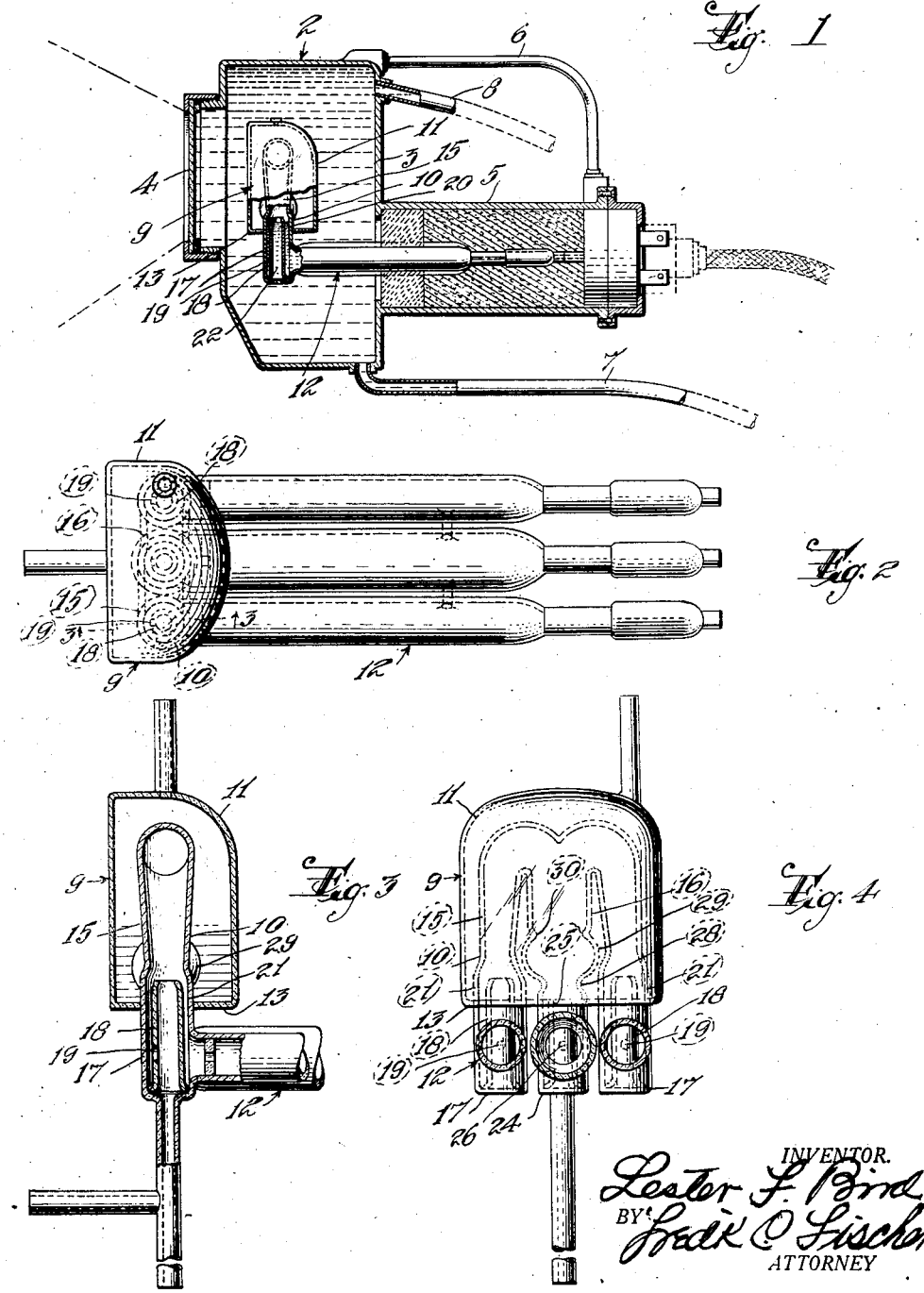

March 27, 1934.  L. F. BIRD  1,952,306
QUARTZ MERCURY ARC LAMP
Filed Feb. 24, 1932  2 Sheets-Sheet 2
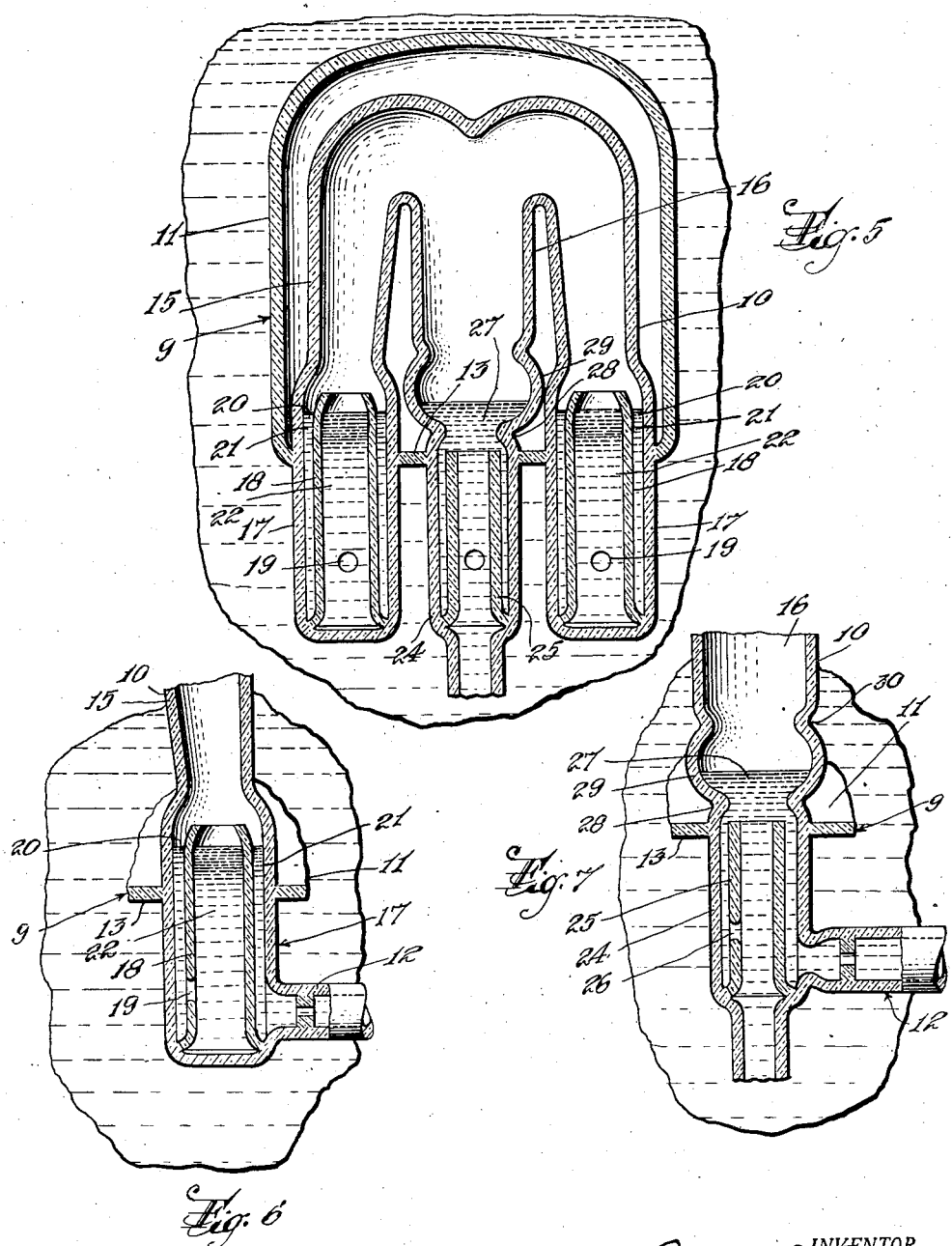
INVENTOR.
Lester F. Bird
BY Fredk C. Fischer
ATTORNEY Patented Mar. 27, 1934

1,952,306

UNITED STATES PATENT OFFICE 1,952,306

QUARTZ MERCURY ARC LAMP

Lester F. Bird, Newark, N. J., assignor to Hanovia Chemical & Manufacturing Company, Newark, N. J., a corporation of New Jersey Application February 24, 1932, Serial No. 594,794

7 Claims. (Cl. 176—43)

This invention relates generically to therapeutic lamps, but more particularly to mercury arc lamps in quartz envelopes constructed and operated for the production of ultra violet, visible and infra red radiations. This type of lamp employs two or more mercury electrodes and is cooled by the circulation of water contained in a jacket or shell surrounding the arc lamp.

The burner of this lamp is constructed of a quartz shell provided with sealed electrode lead-in conductors and partially filled with mercury with or without the addition of traces of inert gases. A jacket of quartz encloses a portion of the burner shell protecting it from contact with the water, while a water-tight outer shell encloses the quartz portions, so arranged that all of the burner excepting the lead-in conductors may be surrounded and cooled with circulating water.

The outer shell is provided with a quartz window immediately in front of the arc tube in order to permit radiations from the arc through said window. The longer infra red radiations are eliminated by the layer of water intermediate the jacket and quartz window.

The object is to provide an arc that is capable of continued operation over an indefinite period with high efficiency, burns steadily without flickering, is sufficiently stable so that it may be moved while lighted to any desired position, will not be affected by the ordinary variations of line supply voltage or of cooling water, and should not discolor rapidly and so lose its efficiency.

Another object is the provision of a structure of this kind which allows for the proper regulation of vapor pressure within the arc tube, since, if the mercury vapor pressure is low in the arc the efficiency of light production is low and the arc intensity weak.

The more efficient types of arcs operate with rather high metallic vapor pressure and while this fact is generally accepted the cooling is a salient feature and is of great importance because the limit of vapor pressure can be easily exceeded and the arc become unsteady; therefore, there is an intermediate pressure for the arc at which the efficiency is good and at which the arc is quite stable. The structure herein shown and described provides for the necessary cooling for the maintenance of the desirable vapor pressure. The temperature of the cooling water, the shape and thickness of the quartz walls of the burner and the quantity of mercury contained in the burner all affect the cooling and the efficiency.

The temperature of the cooling water has been of great importance in the operation of these burners. Many of them are operated from local sources of flowing water. These are commonly the city water supplies. Such water may vary in temperature depending upon the location from 4 degrees centigrade to possible 25 degrees C.

Many arcs are operated on self contained water cooling units in which the water for the burner is circulated by a pump through a small radiator. Self contained units depend upon the surrounding air to cool the radiator. In dwellings the air temperature is ordinarily between the extremes of 16 and 40 degrees C. In order for a radiator to be cooled by the air, the temperature of the radiator must be above that of the surrounding air. This means that the cooling water system is ordinarily at room temperature when the burner is started and the water temperature will gradually rise to a maximum at some value above room temperature. The rise above room temperature is determined by the efficiency of the radiating system and involves a number of factors but for the usual cooling system it is about 15 to 20 degrees C. Allowing for the average conditions the burners are required to operate in water which may vary in temperature from a minimum of 10 degrees C. to a maximum of about 45 degrees C. Such great variations in the temperature of the cooling water impose very difficult conditions for the burner operation. Burners made in the past have not been successfully meeting them. If the burners have been filled and adjusted for cold water operation they often would not operate in warm water. If they were adjusted for warm water operation they were very inefficient in cold water. In all cases the efficiency and light output were seriously affected by changes in the water temperature.

The reason for the large effect of the water temperature on the burner has been determined and the cause located in the great difference in expansion between quartz and mercury with changes in temperature. The coefficient of cubical expansion for mercury is given by P. L. Dulong and A. T. Petit as .00018 while that for fused quartz is approximately .000,0015. It is apparent from these figures that the expansion of fused quartz is negligible compared with mercury. As the temperature of a burner rises the mercury expands and occupies more space. Since the quartz does not expand the mercury fills up more of the inside of the burner and so is equivalent to having a larger filling of mercury. The quantity of mercury in a given burner affects very much the cooling and general performance so that many of these burners have been rather unsatisfactory.

I have determined experimentally that aside from the expansion and contraction of the mercury with its resultant changes in mercury levels in the arc tube the temperature of the cooling water has small effect on the burner performance. If changes could be made in the construction of the burner that would eliminate the effects of mercury expansion the burner would otherwise be independent of water temperature. My invention has accomplished these results.

Further experiment has proved that the major part of the cooling affecting the arc directly is accomplished by the action of the cooling water upon the legs of the burner within one quarter of an inch of the bottom of the jacket. Changes made in the legs of the burner at greater distances from the jacket do not have any measurable effect on the burner performance. Immediately below the jacket the legs are completely surrounded with cooling water. It is obvious that the temperature of the mercury in these tubes is not many degrees above the water temperature. At the top of the mercury pool only a short distance above the jacket the mercury is heated by contact with the arc stream and is very hot, so much so, that quantities of it are continually being vaporized. There exists therefore a great difference in temperature in the mercury within a short distance. Such differences in temperature could not exist were it not for the poor thermal conduction of the mercury. It is obvious therefore that any changes in the height of the mercury surfaces will have a large effect on the heat conduction from the surface of the mercury to the water. Variations in the temperature of the cooling water may cause expansions and contractions in the mercury that change the efficiency and light output of the burner as much as 50 percent. or more.

Any conditions that affect the conduction of heat from the surface of the mercury pools to the outside cooling water will affect the performance of the burner. The diameter of the tubes composing the legs of the burner, the thickness of these tubes, the quantity of mercury in the burner as well as any irregularities in the cooling of an individual leg will all affect the performance of the burner. The vapor pressure in the arc tube is directly dependent upon the temperature of the surface of the mercury pools. If the temperature of the pool is lower than that required by the vapor pressure mercury will continue to condense upon the surface until the temperature is raised to correspond with the vapor pressure. If the temperature of the pool is higher than that required by the vapor pressure mercury will be volatilized from such a pool until the pool is cooled to the equilibrium conditions. In a closed burner there must be an equilibrium established between all of the mercury surfaces and the vapor pressure of the arc tube. The pool that is cold will collect mercury and the pool that is too hot will lose mercury. In a water cooled burner as described this regulation is accomplished by the conduction of heat from the surface of the mercury pools to the cooling water. An increase in mercury will raise the surface of the pool and reduce the cooling and a decrease in mercury will move the surface closer to the cooling water and so make it colder.

The input of a burner is adjusted through the utilization of this characteristic and lower mercury levels result in cold burners and lower vapor pressures for normal voltages while high mercury levels result in hot burners and high vapor pressures for normal voltages.

Another object of this invention is to construct a burner that is practically independent of normal expansion and contraction of the mercury levels by dividing the anode pools of mercury so that the vapor pressure in the burner is not determined to nearly the same extent by the temperature of these pools. In this manner I have overcome one of the serious faults in the present type of burners which have rather restricted areas of mercury for anode pools and are subject to serious limitations resulting from the operation of such a restricted pool. The reasons for this are clearly seen when the performance of such a pool is studied. This pool is subject to contact with the end of the arc stream which operates at very high temperature. No part of the pool can be very far from this stream because of its limitation in size. The end of the arc stream continually volatilizes the mercury from the surface of the pool. This volatilization would speedily remove the mercury from the pool except for the cooling supplied by the water without the quartz walls. The pool must be maintained at such a temperature that mercury is condensed on the surface as rapidly as it is vaporized. Since the end of the arc stream is continually required to warm up the anode surface to the volatilization point and at the same time the pool must be cool enough to recondense the vaporized mercury it is impossible for the anode to be both hot and cold at the same time since the result would be inefficiency in the burner. This difficulty is overcome in the anode by providing two parts to the pool. One part is adapted to operate at a high temperature and act as a terminal for the hot arc stream and the other part is located so as to be maintained at a reduced temperature and so act as a condenser for the vaporized mercury.

Another object is to locate within the anode tube a second smaller tube of such a length and location that it always extends above the surface of the mercury pool and so divides the pool into two portions, an inner circular pool of restricted area and an outer ring shaped pool between the outer quartz tube and the inner tube which causes a very marked difference in the cooling effect on the two portions of the anode. The inner pool is quite well insulated from the cooling water by two thicknesses of quartz wall and a layer of mercury. Its outer area is small due to its small diameter. The outer portion of the anode is relatively remote from the end of the arc stream and is very close to the cooling water. The end of the arc stream readily seeks the inner pool and warms it up to the volatilization temperature while the outer pool of mercury remains quite cold. Mercury that is volatilized from the inner pool is promptly recondensed in the outer ring. The efficiency of such construction is very marked and it is possible to secure an efficiency several hundred percent. above that of the original type of burner.

In order to utilize to the fullest extent the possibilities of the improved anode construction some changes were necessary in the cathode structure. Whereas the arc stream at the anode always seeks the hottest point the arc stream at the cathode always seeks the coldest point. Construction such as that employed at the anode was obviously undesirable. The cathode pool was found to have relatively small effects upon the vapor pressure compared to the anode pools, and the efficiency of light production was not dependent to nearly the same extent upon the conditions surrounding the operation of the cathode pool.

The most serious fault in the operation of the cathode pool was a tendency to boil in the mercury. Bubbles of vapor would form under the surface of the pool and rise to the surface, breaking out into the arc chamber. The bubbles would probably do little harm to the operation except in certain cases. If the bubbles break directly under the cathode spot of the arc it will instantly extinguish the arc. This is of course exactly what happens in the ordinary burner and represents a serious defect.

The tendency of the cathode to boil is easily removed by certain changes in its construction. Overheating of the mercury is the result of heat conducted from the arc stream down the quartz walls to the mercury. The arc stream is extremely hot and separated from the pool of mercury by a relatively short piece of rather thick quartz, and, although the quartz is a poor conductor of heat, because of its location within the jacket of the burner it becomes very hot in order to radiate the heat supplied to it. As a result sufficient heat is conducted to the mercury to make it boil. The obvious thing to do is to make a break in the thermal path or to so lengthen the path that sufficient heat could no longer be transmitted to the mercury. The thermal path has been lengthened by a novel construction in the arc tube. The portion of said arc tube immediately surrounding the surface of the mercury pool has been enlarged into the form of a spherical bulb. This bulb accomplishes three results in the burner operation. It removes the walls of the arc tube farther from the arc stream at the surface of the cathode pool, lengthens the thermal path from the arc stream to the sides of the mercury pool, and increases the area of the cathode pool so that deterioration of the walls of the arc tube adjacent the cathode spot is reduced.

A slight distance above the base the arc tube is reduced in diameter in the form of a pinch. The purpose of the pinch is to reduce the cross section of the mercury column, and so, the heat conductivity. The enlarged spherical bulb is immediately above the pinch. Immediately above the bulb the arc tube is pinched again to a smaller diameter and then continues at an increased diameter to the junction with the anode arc tubes. Below the jacket and inside of the cathode leg there is located a second inner tube. This tube does not operate in the same manner as the inner tubes in the anode legs but is there for the purpose of interfering with the conduction of heat from the surface of the cathode pool to the cooling water. The position of this tube makes the path from the surface of the pool much longer than it would normally be. It also interferes with any circulation there might tend to be in the mercury itself. The form of construction adopted for this leg prevents the occurrence of a very high mercury level in the cathode arc tube which would be the natural result of the enlargement placed at the surface of the pool. The pinch the spherical enlargement is placed there to locate the path of the arc stream and to arrest the deterioration that is common to the cathode leg at this point.

I have described my invention in detail in the foregoing disclosure as being applicable to metallic mercury anode type arcs but it is obvious that it is equally applicable to any arc employing an amalgam for electrode material. I therefore include in the scope of my invention any practicable liquid amalgam anode material.

It is also obvious that the operation of my invention is not limited by any kind of gas filling that might be employed in the arc tube in addition to the mercury filling.

In order to more fully comprehend this invention and the art to which it relates reference must be made to the accompanying drawings which taken in connection with the following specification form part of this application, of which:—

Figure 1 represents a longitudinal section through a conventional type of arc lamp, with parts in elevation, Figure 2 represents a top plan view of a burner, Figure 3 is a cross sectional view of same taken on line 3—3 of Figure 2, Figure 4 is an end elevation of the burner, Figure 5 indicates an enlarged longitudinal section of a burner, Figure 6 indicates a fragmentary longitudinal section of an anode member of a burner, enlarged, and Figure 7 is a similar view of the cathode member.

Like numerals of reference indicate like parts in the several figures of the drawings, of which:—

The numeral 2 indicates a lamp body consisting of a main water containing compartment 3, a quartz window 4, a rearwardly extending housing 5, a handle 6, water inlet 7 an outlet 8 attached to main water containing compartment 3.

Positioned within the main water containing compartment 3 and submerged in the water therein is a mercury quartz arc lamp 9 which consists of an inverted W-shaped burner member 10, the upper portion of which is surrounded by the vacuum chamber 11, while the lower legs of said burner extend downwardly below the vacuum chamber 11 and rearwardly as at 12, in order to form suitable contact means with the circuits.

It will be noticed that according to this construction the arc tube only comes in contact with the water at its lower extremities and is cooled thereby, while the upper portion or the body of the inverted W-shaped burner 10 is encased by vacuum chamber 11 which is cooled by the water.

With reference to Figures 4 and 5, the detailed construction of the burner and the method of filling the same with mercury will be apparent in the following description; it is to be understood that the lamp and its water chamber do not form any part of the production or construction of the quartz lamp itself.

When the air is exhausted from chamber 11 the mercury is allowed to pass into anode legs 12 slightly above the bottom of vacuum chamber 11. Such a burner can be lighted readily by tipping the arc tube forward so that the mercury contained in the legs rises into the arc tubes 15 and 16 until contact results between the mercury in the different divisions of the arc tubes. By restoring the burner to its normal position the mercury naturally falls back into the legs breaking the contact between the pools of mercury and striking an arc.

By observing Figure 6 it will be seen that the anodes are formed with vertical legs 17 integral therewith, while inner tubes 18 are attached to said legs 17 extending upwardly past base 13 of the vacuum chamber 10. These inner tubes are open at the top and have apertures 19 adjacent the bottom thereof to allow mercury 20 in annular ring 21 to come into contact with the mercury 22 in tubes 18.

As the end of the arc stream volatilizes the upper surface of the inner pool and since said pool is remote from the water, the end of the arc stream readily volatilizes the mercury 22 and recondenses it in mercury pool 20.

In Figure 7 a different condition exists and although cathode leg 24 has an inner tube 25 attached thereto, the construction is for a different purpose than that of the anodes. It will be noted in this figure that the lower end of inner tube 25 has an aperture 26 therein and is entirely submerged in mercury 27.

A slight distance above the base 13 the tube is reduced in diameter forming a pinched-in portion 28. This lessens the cross-section portion of mercury 27 while above said pinched-in portion 28 is an enlarged spherical bulb 29 and immediately above said bulb is another pinched-in portion 30. Arc tube then continues until it forms a juncture with the anode tubes. The structure here described is for the purpose of interfering with the conduction of heat from the surface of the cathode pool to the cooling water and naturally causes the path of travel to be much longer than normal and also tends to interfere with any circulation of the metallic liquid. This structure prevents the occurrence of a very high mercury level in the cathode arc tube which would be the normal result of the enlargement placed at the surface of the pool.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention what I claim as new and desire to secure by Letters Patent is:

1. A mercury arc lamp employing a metallic liquid for the anode material, a plurality of anodes, a plurality of divided anode pools, one division of each pool acting as a terminal for an arc stream and the other divisions as condensation areas, a burner constructed of fused quartz, arc tubes enclosed within a fused quartz jacket, said burner being enclosed in a water cooling shell and adapted to be water cooled, a cathode constructed of an inner and outer tube, metallic liquid within said tubes surrounding and submerging the inner tube, a spherical enlargement formed on said outer tube and pinched-in portions adjacent said spherical enlargement.

2. A quartz mercury lamp employing a metallic liquid for the anode and cathode material, a plurality of anodes, a plurality of divided anode pools, a divided cathode pool, a burner constructed of fused quartz, a quartz shell surrounding said burner, an inner tube of the cathode submerged in the metallic liquid, an outer tube of said cathode formed into a spherical bulb at a predetermined location thereon and pinched-in portions reducing the capacity of said tube adjacent the spherical bulb.

3. A quartz mercury lamp employing a metallic liquid for the anode and cathode material, a plurality of anodes, a plurality of divided anode pools, a burner constructed of fused quartz, a quartz shell surrounding arc tubes of said burner, an inner tube of the cathode submerged in the metallic liquid, an outer tube of said cathode formed into a spherical bulb at a predetermined location thereon and pinched-in portions reducing the capacity of said tube adjacent the spherical bulb, and means to connect the liquid of the inner pool with the outer pool of the cathode.

4. A mercury arc lamp employing a metallic liquid for the anode material, a plurality of anodes, a plurality of divided anode pools, one division of each pool acting as a terminal for an arc stream and the other divisions as condensation areas, a burner constructed of fused quartz, arc tubes enclosed within a fused quartz jacket, said burner being enclosed in a water cooling shell and adapted to be water cooled, and a cathode constructed of an inner and outer tube, metallic liquid within said tubes surrounding and submerging the inner tube.

5. A quartz mercury lamp employing a metallic liquid for the anode and cathode material, a plurality of anodes, a plurality of divided anode pools, a divided cathode pool, a burner constructed of fused quartz, a quartz shell surrounding said burner, an inner tube of the cathode submerged in the metallic liquid, an outer tube of said cathode formed into a spherical bulb at a predetermined location thereon.

6. A quartz mercury lamp employing a metallic liquid for the anode and cathode material, a plurality of anodes, a plurality of divided anode pools, a divided cathode pool, a burner constructed of fused quartz, a quartz shell surrounding said burner, an inner tube of the cathode submerged in the metallic liquid, and an outer tube of said cathode having pinched-in portions reducing the capacity of the tube at predetermined locations thereon.

7. A quartz mercury lamp employing a metallic liquid for the anode and cathode material, a plurality of anodes, a plurality of divided anode pools, a burner constructed of fused quartz, a quartz shell surrounding arc tubes of said burner, an inner tube of the cathode submerged in the metallic liquid, an outer tube of said cathode, and means to connect the liquid of the inner pool with the outer pool of the cathode.

LESTER F. BIRD.